(12) United States Patent
Hodges

(10) Patent No.: US 6,334,547 B1
(45) Date of Patent: Jan. 1, 2002

(54) METHOD AND APPARATUS FOR MANIPULATING A LENGTH OF FLEXIBLE MATERIAL

(75) Inventor: Michael John Hodges, Buckinghamshire (GB)

(73) Assignee: Detexomat Machinery Limited (GB)

( * ) Notice: Subject to any disclaimer, the term of this patent is extended or adjusted under 35 U.S.C. 154(b) by 0 days.

(21) Appl. No.: 09/110,578

(22) Filed: Jul. 6, 1998

(30) Foreign Application Priority Data

Jul. 19, 1997 (GB) ............................................. 9715494
Mar. 18, 1998 (EP) ............................................. 98302009

(51) Int. Cl.⁷ ............................................. B65G 59/00
(52) U.S. Cl. ..................................................... 221/278
(58) Field of Search .................................. 221/278, 211, 221/210; 406/45, 50, 107, 191

(56) References Cited

U.S. PATENT DOCUMENTS

| | | |
|---|---|---|
| 2,722,348 A | 11/1955 | Ammon |
| 2,898,021 A | 8/1959 | Miles et al. |
| 2,964,221 A | 12/1960 | Fuqua |
| 2,999,618 A | 9/1961 | Smith |
| 3,353,726 A | 11/1967 | Kronsbein |
| 3,355,074 A | 11/1967 | Brewin et al. |
| 3,429,618 A | 2/1969 | Sparso et al. |
| 3,672,313 A | 6/1972 | Firestein et al. |
| 3,696,942 A | 10/1972 | Kitchener et al. |
| 3,704,565 A | 12/1972 | Glaze, Jr. |
| 3,793,968 A | 2/1974 | Beazley |
| 3,941,069 A | 3/1976 | Fukuyama |
| 4,099,789 A | 7/1978 | Zaglio |
| 4,166,556 A | 9/1979 | Annas, Sr. |
| RE30,410 E | 10/1980 | Povlacs |
| 4,364,320 A | 12/1982 | Nakhle et al. |
| 4,440,329 A | 4/1984 | Hodges |
| 4,538,534 A | 9/1985 | Frazier et al. |
| 4,539,924 A | 9/1985 | Bell, Jr. et al. |
| 4,550,868 A | 11/1985 | Hodges et al. |
| 4,598,817 A | 7/1986 | Bell, Jr. et al. |
| 4,602,710 A | 7/1986 | Bell, Jr. et al. |
| 4,620,494 A | 11/1986 | Takatori et al. |

(List continued on next page.)

FOREIGN PATENT DOCUMENTS

| | | |
|---|---|---|
| EP | 0508014 A2 | 10/1992 |
| EP | 0521206 A1 | 1/1993 |
| EP | 737769 A1 | 10/1996 |
| FR | 2003556 | 11/1969 |
| FR | 2148248 | 3/1973 |
| FR | 2377344 | 8/1978 |
| FR | 2660638 | 10/1991 |
| GB | 1201754 | 8/1970 |
| GB | 2013738 A | 8/1979 |
| GB | 2081316 A | 2/1982 |
| WO | WO 9527097 | 10/1995 |

OTHER PUBLICATIONS

EPO Search Report dated May 31, 1999.

Primary Examiner—Christopher P. Ellis
Assistant Examiner—Rashmi Sharma
(74) Attorney, Agent, or Firm—Dority & Manning

(57) ABSTRACT

An apparatus for manipulating flexible articles comprising an openable dispenser (116) for retaining one article (123) disposed along the dispenser (116) and arranged so that the (116) dispenser continues to support the article (123) when it is opened and in that the apparatus includes movable gripping means (400) arranged to grip the hose (123) at two predetermined positions and thereafter lift the article (123) from the dispenser (116). The gripping means (400) may comprise a pair of spaced-apart grippers (402) or a gripper and suction tube arrangement mounted on a common support (404) and moveable towards and away from the dispenser by a pneumatic or hydraulic piston and cylinder (406) arrangement. A method of manipulating a flexible article is also disclosed.

10 Claims, 4 Drawing Sheets

U.S. PATENT DOCUMENTS

| | | |
|---|---|---|
| 4,643,340 A | 2/1987 | Bailey |
| 4,649,838 A | 3/1987 | Gazzarrini |
| 4,784,070 A | 11/1988 | Thurner et al. |
| 4,862,815 A | 9/1989 | Thurner et al. |
| 4,943,198 A | 7/1990 | McCabe |
| 5,040,475 A | 8/1991 | Fournier et al. |
| 5,165,355 A | 11/1992 | Fournier et al. |
| 5,511,501 A | 4/1996 | Bell et al. |
| 5,544,603 A | 8/1996 | Bell et al. |
| 5,771,830 A | 6/1998 | Hodges |

METHOD AND APPARATUS FOR MANIPULATING A LENGTH OF FLEXIBLE MATERIAL

The present invention relates to apparatus for manipulating a length of flexible material (i.e. limp articles) and is particularly, but not exclusively, applicable to manipulating hose blanks.

If a length of flexible material is to be processed by an automatic machine it is necessary to first load the material appropriately prior to processing. In the case of pantyhose manufacture, for example, the processing of hose blanks to make pantyhose generally involves three basic machines namely a line closer, a toe closer and a gusset sewing machine. Linking machines are available which can automatically transfer partially processed pantyhose between one machine and the other but in order to obtain a fully automated system it is necessary that the first machine in the sequence is also loaded automatically rather than manually by an operator.

In order to effect such automatic loading it is necessary to retrieve a single length of the flexible material, in this particular example a hose blank, from a collection of them.

Most hosiery leg blanks are produced on small diameter knitting machines and after knitting each is sucked pneumatically into a dispensing device which is usually a feature of the knitting machine. The hose blanks are then ejected or dispensed from the dispensing device into a sack where they can be subject to some form of relaxation. Relaxation is a process where the hose blanks are tumbled or vibrated while being subjected to steam or hot air which has the effect of relaxing or "shrinking" them. At the end of the knitting process, therefore, the manufacturer has a number of hosiery leg blanks in bags which are then delivered to the making up room to be processed by the pantyhose processing machines.

EP-A-0 737 769 discloses an apparatus for retrieving lengths of flexible material.

This application discloses a removing means for removing one or more of said lengths of material from a storage bin and arranged to release them at the entrance of a conduit, propelling means for selectively sucking and blowing the lengths of material along the conduit to or from an elongate dispenser, the dispenser having a latch means at the end nearer the propelling means and being configured so that only one of the lengths of material con be latched by the latch means and sufficiently long to hold the length of material when positioned lengthwise within it. The dispenser can be a commercially available Detexomat dispenser.

When suction is applied to the conduit the one or more lengths of material released at the entrance of the conduit are sucked to the elongate dispenser where they bunch up at a grill at the dispenser end. The latch means is then latched and by virtue of its design will engage one only, in general, of the lengths of material in the dispenser. This can be achieved by placing the latch at the apex of a narrow trapping end of the dispenser, for example, where only one of the lengths of material can reach at a time. Usually the end of the length of material will be in a position to be latched but it can happen that a folded length may be gripped at a position not adjacent an end.

The fluid flow is then reversed to act to blow the lengths of material out of the dispenser along the conduit back towards the storage bin, for example, containing the collection of lengths of material from which they came.

Only the latched length of material will remain in the dispenser, the remainder, if there was more than one in the dispenser, being returned to the collection of lengths of material. This one, latched, length of the material will generally be straightened to extend along the dispenser during this process.

The blowing is stopped after a predetermined period of time, sufficient to allow any extra lengths of material to return to the collection of lengths of material, whereupon the latch is released and the dispenser opened to allow the single length of hose to drop free of the dispenser.

This apparatus therefore allows a single length of material to be retrieved from the collection of lengths of material even if the removing means element of the apparatus is not sufficiently selective to ensure only one length of material is picked up by it.

It should be noted that the retrieval apparatus is configured so that as far as possible only one length of material is latchable, but it may be that on a rare occasion more than one may be latched, if for example two lengths are stuck together for some reason.

Generally, an end of the flexible material will be latched and so be extended along the dispenser. If not achieved it is preferable to reload the dispenser without letting the length of material already in the dispenser drop out. This can be achieved by providing means for determining the presence of the length of material a predetermined distance from the latch, e.g. by a photodetector arrangement, e.g. a SYNATEL PE2OF photodetector.

If no material is detected, the latch can be released but instead of opening the dispenser the propelling means is caused to blow again, blowing the length of material back to the collection of lengths of material.

Should no length of material have been presented to the conduit means, this determination will again show no material present at the determining means. The blowing back is now unnecessary but it can be arranged that the apparatus does so any way so the same control procedure can be used to properly locate a length of material in the dispenser just as if a folded length, say, had been latched. The single length of material dropped from the dispenser.

The apparatus of EP-A-0 737 769 includes a conveyor means positioned beneath the dispenser arranged to move the dropped length of material laterally from beneath the dispenser.

It has been found that this method of using the dispenser to orient a length of hose is generally acceptable but does, on occasion, fail to operate as designed.

Sometimes the yarn in the hose will become unravelled and become attached to grill of the dispenser used to trap the hose within the dispenser when it is sucked into the dispenser. The hose does not then fall freely from the dispenser when it is opened as it is caught at one end.

Static electricity on the nylon hose can also act to prevent the hose dropping cleanly from the dispenser and affect the way the article falls and lies on the conveyor.

Further, the hose, even if dropped cleanly, can become disoriented due to random falling action, especially by air currents and draughts that can influence the very light fabric of a hosiery article.

The present invention seeks to alleviate these disadvantages by providing an apparatus and method characterised by the features of the characterising portion of claims 1 and 5, respectively.

This apparatus provides that the article can be retrieved from the dispenser in a uniform manner.

A further advantage of the present invention is that picking the hose directly from the dispenser eliminates the stage of dropping the hose from the dispenser on to a conveyor or chute and then picking it up from a random position. That is, it eliminates the need to dispense the hose and re-pick it which is time consuming.

The gripping means may comprise a pair of spaced apart grippers but in some cases it may be necessary only to provide only one gripper. By the term gripper is meant any device which can be securely attached to the article.

If two or more grippers are present they may be independently movable or, preferably, may be mounted on a common support. This provides that the grippers can be moved by a common transport mechanism coupled to the common support, e.g. by a pneumatic or hydraulic piston/cylinder arrangement.

In a preferred embodiment of the present invention the gripping means includes one gripper and suction tube, which arrangement can provide several advantages over the dual-gripper embodiment.

Should, for any reason, two articles be retained by the dispenser, the suction tube on application of suction will suck the loose article away from the dispenser. It could conveniently be arranged that the loose article is thereby transported back to a store of the flexible materials to be picked up again at a later time.

If there is one article retained in the dispenser but for any reason the gripper fails to grip the article, again the suction tube will effect removal of the article from the dispenser, preferably to a store again to be picked up for processing at a later time.

If a single article has been retained in the dispenser and properly gripped by the gripper, the article will be held at one end by the gripper with the free length held by the suction tube with an end section of the article retained within the suction tube. This means the gripper assembly need only be able to lift that part of the hose hanging free from the gripper above the dispenser (which will be a predetermined length fixed by the distance of the gripper from the closer end of the dispenser when the article is gripped). This is because any variation in article length, due to different articles being processed, for example, will be accommodated within the suction tube with none hanging below the end of the article at the gripper. This therefore provides a gripper means with support means which need only lift the predetermined length of article from the dispenser whereupon the dispenser can be closed.

A further advantage of the gripper/suction tube arrangement is obtained when the end of the hose of the gripper is presented to a further suction tube for transporting for further manipulation or processing. On turning off the suction at the suction tube of the gripping means the article will flow easily from the suction tube to the further suction tube providing a smoother transfer of the article from the gripping means to the further suction tube than the two gripper arrangement.

The suction tube and gripper means are preferably mounted on a common support means for but mounting on distinct supports independent actuation is possible.

Embodiments of the present invention will now be described by way of example only with reference to the accompanying, non-scale, figures of which:

Figure 1:
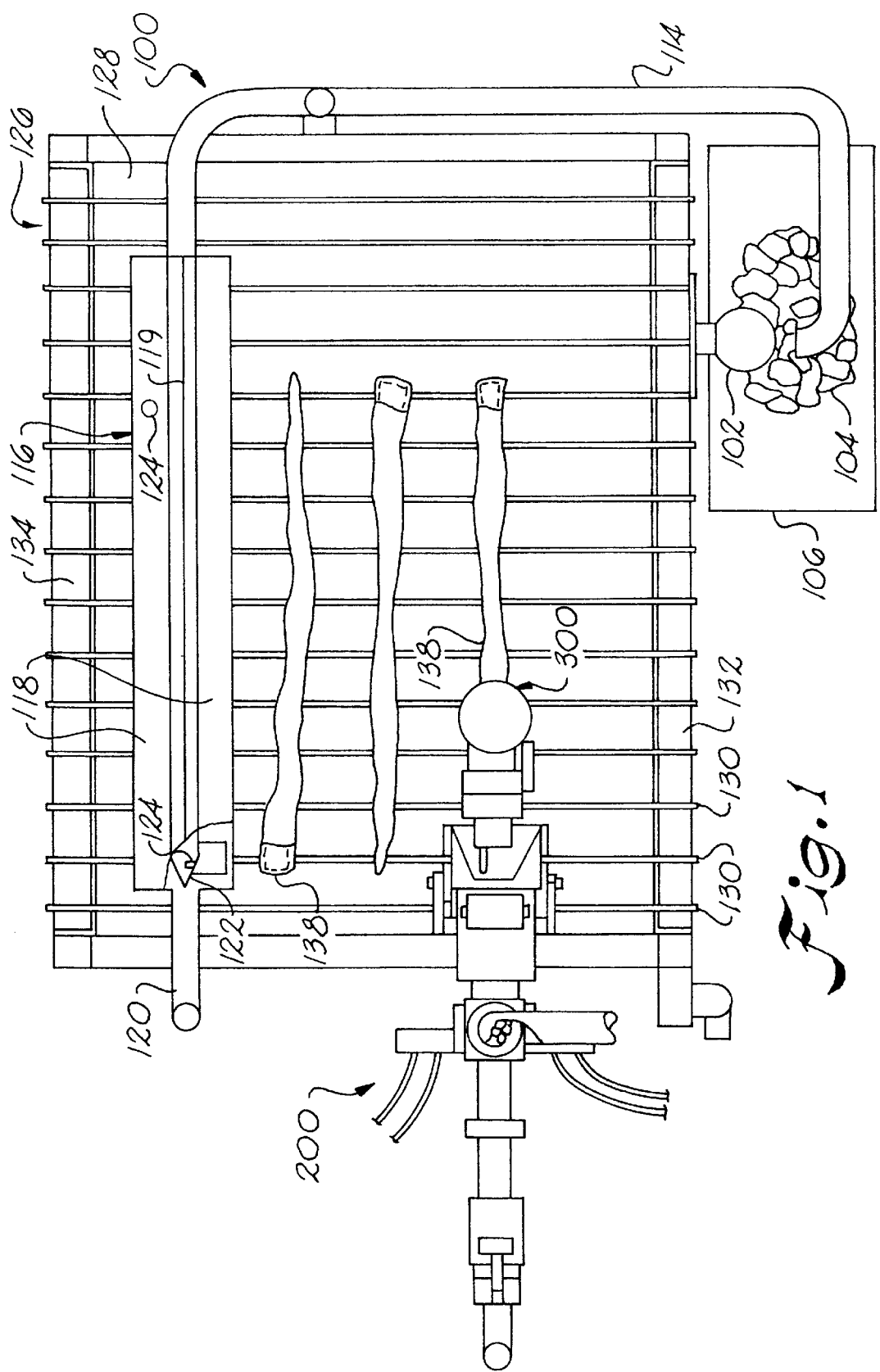
FIG. 1 is a diagrammatic plan view of the retrieving apparatus of EP-A-0 737 769.

FIG. 1 shows the apparatus of EP-A-0 737 769 illustrating a system of combined retrieving and orienting apparatus including a retrieving apparatus indicated generally by the reference numeral 100 and an orienting apparatus indicated generally by the reference numeral 200. The retrieving apparatus includes a gripping means 102 for gripping and removing one or more lengths of flexible material, in this case tubular hose 104 from a storage bin 106.

The gripping means includes a pair of opposable gripping arms which are pivotable to permit the arms to move together thereby gripping a tubular hose between the arms. The gripping arms can be raised and lowered vertically to lower the gripping arms into the storage bin 106 to be in a position to grip a tubular hose 104 and to lift the tubular hose out of the storage bin 106 by moving vertically upwards. The motive power for these operations is obtained from a motor, not shown.

A conduit 114 has one open end positioned above the storage bin 106 at a location where tubular hose raised out of the bin by the gripping means 102 can be presented to the opening of the conduit 114. The conduit 114 extends horizontally rearward of the apparatus to an elongate dispenser 116 and extends from the other end of the dispenser 116 via conduit 120 of the conduit to a suction motor, not shown, located beneath the dispenser 116.

The dispenser 116 has two longitudinally extending side portions or wings 118 hinged along a central hinge line 119. When the wings 118 of the dispenser 116 are closed the interior of the dispenser completes an airflow path from the conduit 114 through to the conduit 120. The flow path in the dispenser 116 towards the conduit 120 and suction motor narrows to form a constricted throat 122 at the end of the dispenser. Positioned close to the apex of the throat 122 is a latch 124 in front of a grill (not shown) for trapping the hose in the dispenser on route to the conduit 120. The latch 124 can be moved from a retracted position to a position extending across the throat 122 across the dispenser 116. Located in one of the wings 118 is a photodetector 124 which is arranged to detect whether or not any material lies within the dispenser 116 at this position. The dispenser 116 is supported above a bed 126 which is in the form of a metal panel 128 across which run endless belts 130 fitted around shafts 132 and 134 at opposite ends of the plate 128. The shaft 132 is a driven shaft rotatable by motor, not shown, via a transmission, also not shown. The shaft 134 is a driven shaft which rotates when the belts 130 are rotated by the driven shaft 132.

The belts are spaced sufficiently close such that they can move a length of tubular hose 138 across the plate 128 which the hose contacts where it sags between the conveyor belts 130 and rubs against the plate 128.

The retrieval apparatus 100 of FIG. 1 operates as follows.

A gripper 102 is lowered into a bin 106 until it reaches a collection of hose 104. The distance the gripper is lowered into the storage bin can be controlled by any convenient sensor which determines when the gripper is at or close to the top of the pile of tubular hose. For example a contact switch can be located at the end of the gripper 102 which closes on contact with the topmost tubular hose 104 thereby indicating to an automated control system (not shown) that the gripper 102 has reached the desired position within the storage bin 106. Alternatively, a photocell with a limited focal length may be used.

The control then causes the gripper arms of the gripper 102 to rotate and meet together thereby gripping one or more of the tubular hose 104 whereupon the gripper arm is raised to a position where the lower end of the tubular hose gripped by the gripper is adjacent the opening of the conduit 114.

This raised position of the gripper 102 can be determined by means of a photodetector arrangement, for example, positioned below the opening of the conduit 104 which will give an indication to the control means when the lowermost end of the hose gripped by the gripper has just passed the photodetector thereby indicating that the lowermost extremity of the tubular hose is in the required position adjacent the opening of a conduit 114.

A suction motor, not shown, is then coupled to the conduit 120, dispenser 116 and conduit 114 to suck the gripped hose into the conduit 114 whereupon the gripper arms are retracted away from each other thereby releasing the hose 104 so that they are sucked along the conduit 114 into the dispenser 116 to be trapped by the grill adjacent latch 124.

The hose 104 entering the conduit 114 will bunch up at the distal end of the conduit of the dispenser 116 at the throat 122 against the grill. Generally speaking only one hose will be in the throat 122 in a position to be latched by the latch 124 when it is now closed across the throat 122 although it is possible that in some circumstances two hoses may be in such a position. After the latch 124 has been extended across the throat 122 the motor, not shown, is connected to the conduit 120 such that the flow of air through the conduit 120 is reversed. If more than two hose had entered the conduit 114 initially, of which one is now gripped in the dispenser, those additional hose will now be blown back along the conduit 114 to return to the storage bin 106 whilst the hose latched in the dispenser 116 will be extended along the dispenser 116 from the latch 124 towards the end of the dispenser 116 nearer the conduit 114.

If only one hose was initially introduced into the conduit 114 then the above blowing operation still takes place but in this case the only action is to extend the hose 104 latched by the latch 124 in the manner just described.

In either case there will be, except in exceptional circumstances, only one hose latched by the latch 124. In this particular application shown in FIG. 1 it is preferable that it is the end of the hose in the dispenser 116 that has been latched by the latch 124. That this has been achieved can be determined in this embodiment by use of the photodetector 124 which can be used to indicate whether there is any material in the dispenser at the position of the photodetector 124. Because the photodetector 124 is located in a position slightly short of the length of the hose 104, if the photodetector indicates the presence of material then the controller will have determined that the trapped hose is indeed latched near one of its ends. If, however, the photodetector 124 indicates that there is no material in that position then the inference the controller can make is that the latch 124 has latched the hose more towards the middle causing the effective shortening of the hose within the dispenser 116 or not trapped a hose at all. In this case the controlling means releases the latch means 124 while still blowing air in the direction of the storage means 116 thereby removing any hose 104 from the dispenser 116 and returning it to the storage bin for a repeat attempt at reloading a length of hose to attempt to once more to latch hose at one end by the latch means 124 as required.

If the gripper 102 failed to grip any hose 104 in the bin 106 then there will be no hose in the dispenser 116 to be trapped by the latch means 124. Again, the photodetector 124 will indicate to the controller that there is no material at that position and so will continue to blow air in the direction towards the storage bin 106 for the time required to transport hose back to the storage bin, even though there is none present in this case, whereupon reloading will again take place. Once the dispenser 116 has latched a hose which extends to a photodetector 124 whilst air is blowing through the conduit 120 toward the storage bin 106 then the blowing is stopped and the latch 124 can be released to leave a hose lying within the dispenser which can then be opened by pivoting the wings 118 apart about the hinge line 119 thereby allowing the hose to drop onto the conveyor belts 130 to be moved laterally away from beneath the dispenser 116.

This action is then repeated the result being a succession of hose 138 laid out along the conveyor belts 130 separated from each other by an amount the conveyor belt is incremented after the controller determines that the hose has been successfully trapped in the dispenser 116 and subsequently dropped onto the conveyor belts 130.

The net result of the above operations of the retrieval apparatus 100 is that during each cycle of the operation of the retrieving apparatus 100 a single hose is retrieved from the storage bin 116 whether or not the gripping means itself retrieves more than one hose 104 from the storage bin 106.

In the apparatus of FIG. 1 the conveyor belts 130 transfer each of the successively transferred single hose 104 towards an orienting apparatus 200 which will not be described here.

A gripper mechanism designated generally by the reference numeral 300 includes a gripper, not shown, which can be raised or lowered vertically in known manner.

By this arrangement the distal end of the hose can be presented to the orienting apparatus 200. This will not be described further.

Figure 2:
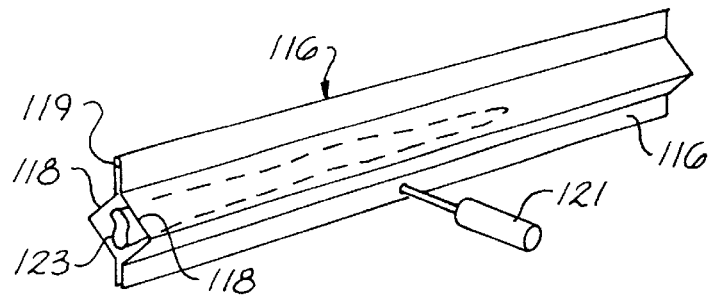
FIGS. 2 and 3 are schematic perspective views showing stages of the operation of the dispenser of FIG. 1 when an end of the article snags the dispenser.
Figure 3:
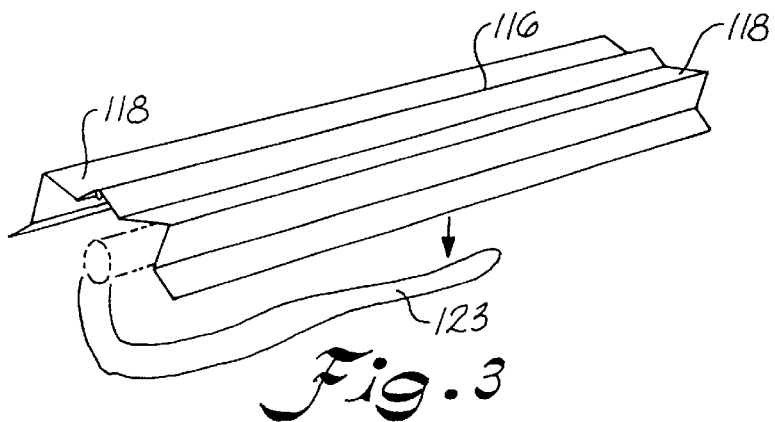

As noted above, the hose may, in some circumstances, not fall in a consistent manner as shown in FIGS. 2 and 3 which show, schematically, the dispenser 116 whose wings 118 are opened and closed about the hinge 119 by a pair of pneumatic actuator 121 (only one of which is shown in FIG. 2 and none shown in FIG. 3). When the side portions 118 are opened, as shown in FIG. 3, the hose 104 can fall freely except if snagged as shown in FIG. 3.

These, and the remaining Figures do not shown the latching means, for simplicity.

Figure 4:
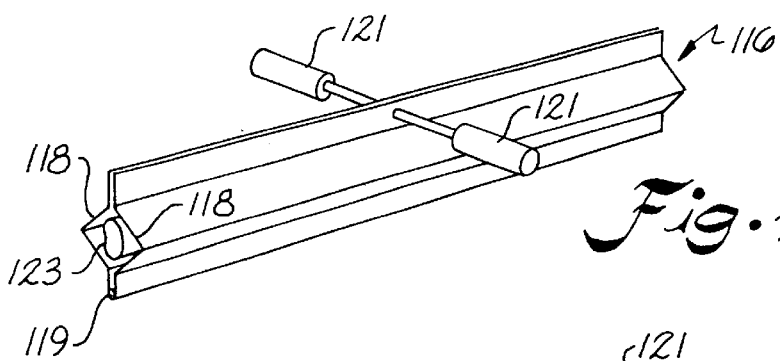
FIGS. 4 and 5 are schematic perspective views showing the stages of operation of a first embodiment the dispenser of the present invention.
Figure 5:
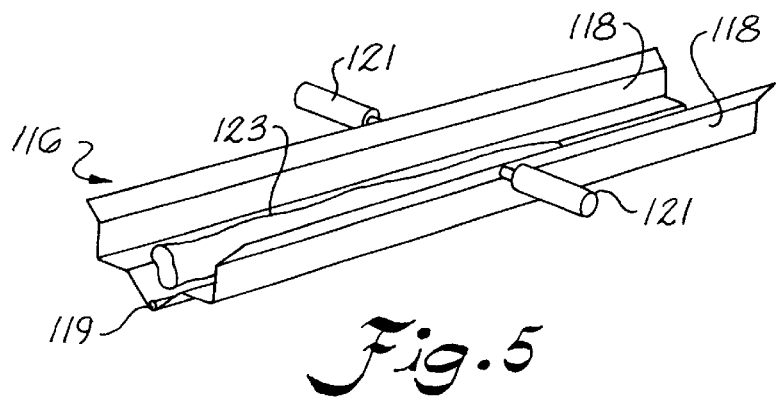

Referring now to FIGS. 4 and 5, the dispenser 116 of the present invention is as shown in FIGS. 2 and 3 but inverted about the horizontal plane. It is illustrated with the same reference numerals as used in FIGS. 2 and 3.

In the position shown in FIG. 4, the hose 123 has been retained in the closed dispenser 116 as described above. The side portions 118 are then pulled apart by the pneumatic actuators 121 leaving the hose 123 supported by the dispenser 116 to be lifted out by a gripper means not shown in FIGS. 4 and 5 but as will now be described with reference to FIGS. 6 to 8.

The gripping means 400 of this exemplary embodiment includes a pair of spaced-apart grippers 402 mounted a predetermined distance apart on a supporting cross-member 404 which is moveable up and down vertically by a piston/cylinder arrangement 406.

The use of grippers to grip flexible articles is well known in this field, as are apparatus and techniques for moving them towards and away from articles and their control to effect synchronisation of the grippers with such movement to grip and lift articles such as hose. The construction and operation of the gripping means will not, therefore, be described in further detail.

Suitable grippers, for example, are Festo type 161 833 HGW-16-A pneumatic grippers manufactured by Festo KG, Essliengen, Germany.

Figure 6:
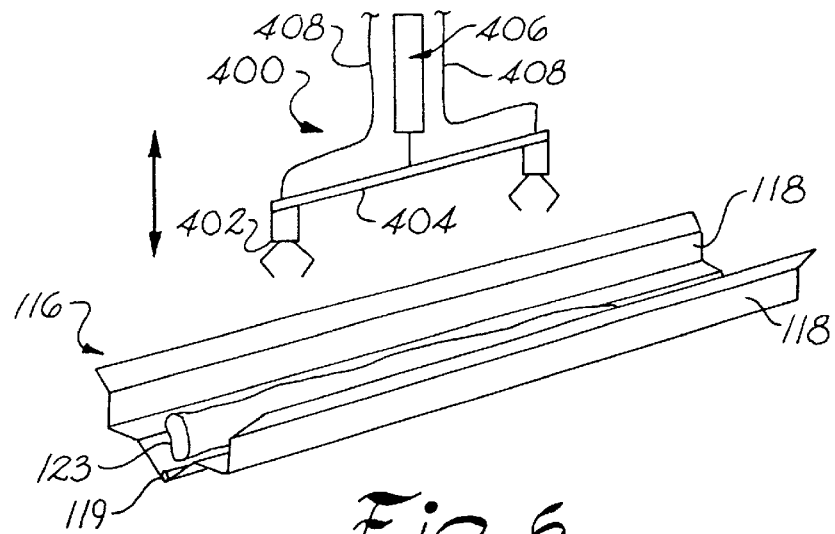
FIGS. 6 and 7 are schematic perspective views showing stages of operation of an embodiment of the present invention, including the dispenser of FIGS. 4 and 5.
Figure 7:
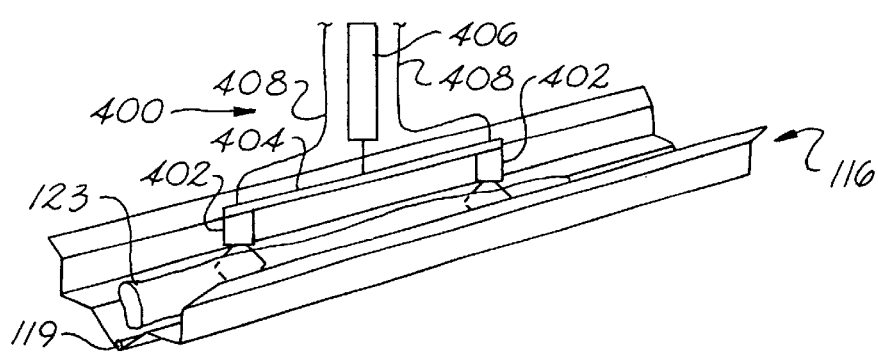
Figure 8:
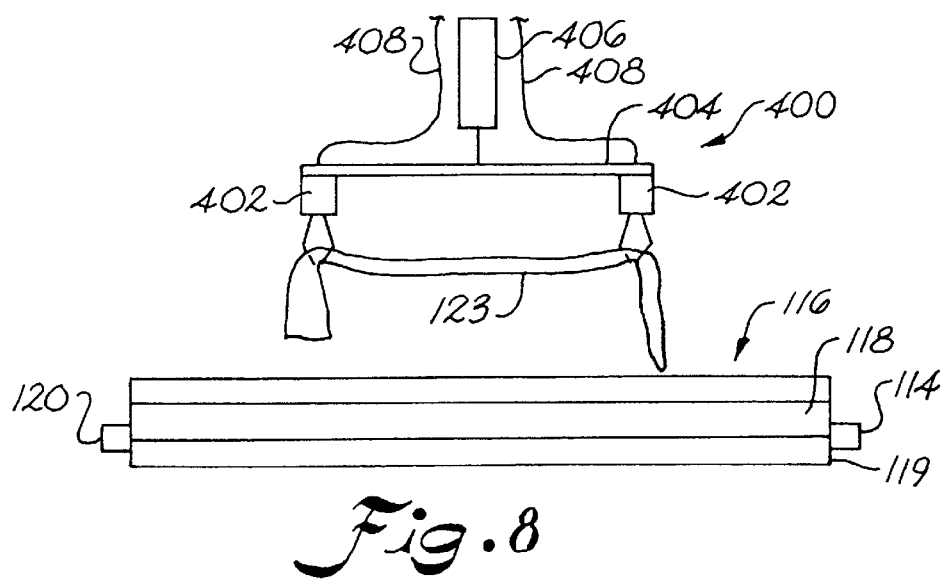
FIG. 8 is a schematic side view of the apparatus of the present invention after removal of an article from the dispenser.

Pneumatic pipes used to actuate the grippers 402 are referenced 408 in FIGS. 6 to 8.

The operation of the apparatus of the embodiment of FIGS. 4 to 8 is as follows.

A hosiery article 123 is retained in the dispenser 116, as described earlier. The side portions 118 of the dispenser 116 are pulled apart to expose the supported hose 123 as shown in FIGS. 5 to 7.

The gripping means 400 is lowered with the gripper 402 open from the position shown in FIG. 6 to that shown in FIG. 7 by means of the piston/cylinder actuator 406 whereupon the grippers 402 are closed to grip the hose 123 in two predetermined positions.

The gripping means 400 is then raised by means of the actuator 406 to lift the hose 123 from the dispenser 116 in a reproducible manner as shown in FIG. 8 for further processing.

Figure 9:
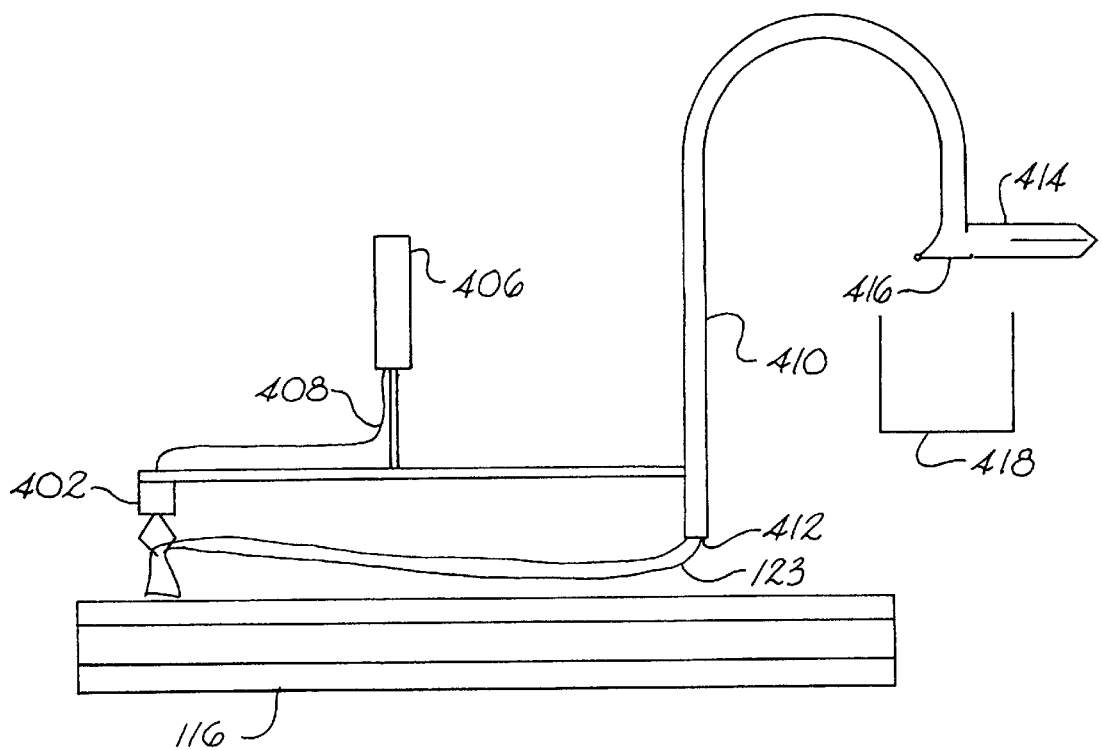
FIG. 9 is a schematic side view of a second embodiment of the present invention.

Referring now to FIG. 9, a further embodiment of the present invention is largely as that of FIGS. 4 to 8 (with common features indicated by the same reference numerals) but in which one gripper 402 is replaced by a suction tube 410 whose dispenser-facing opening 412 is approximately level with the lower end of the gripper 402.

The suction tube 410 is connected at its end distal from the opening 412 to a source of suction (not shown) in known manner.

The suction tube includes a trap formed by a grill 414 which traps any article 123 sucked up the suction tube 410 if the gripper 402 fails to grip the article 123 in the dispenser 116 or if there is a second article 123 in the dispenser and only one is gripped by the gripper 402. An article 123 trapped by the grill 414 can be subsequently released by opening a trap door 416, when the suction is removed, allowing the article to fall into a storage bin 418.

The embodiment of FIG. 9 is operated as that of FIGS. 4 to 8 to obtain, usually, one article 123 along the length of the opened dispenser 116. The gripping means is lowered and the gripper 402 activated to grip the article 123 at one end. Suction is then applied to the suction tube 412 to draw the other end of the article 123 into the suction tube 410. Any non-gripped article in the dispenser 116 will be removed to the grill 414.

The gripping means is then lifted sufficiently to lift the article 123 clear of the dispenser 116 when closed whereupon the dispenser 116 is closed (as shown in FIG. 9). The minimum lift distance is fixed and determined by the distance of the gripper 402 from the end of the dispenser 116 when it grips the article 123, i.e. independent of article length, because the suction tube 410 retains the other end portion regardless of the length of the article 123.

When the article 123 is to be released the gripper 402 is opened and the suction removed. The trap 416 is then opened to allow any returned article to drop into the storage bin 418.

What is claimed is:

1. An apparatus for manipulating flexible articles comprising:
    an openable dispenser for retaining one article disposed along the dispenser, the dispenser being arranged so that the dispenser continues to support the article when the dispenser is opened; and
    a moveable gripping mechanism comprised of one or more grippers, each of said one or more grippers being moveable between an open and closed position, said gripping mechanism being arranged to grip the article at one or more predetermined positions and thereafter lift the article from the dispenser.

2. An apparatus as claimed in claim 1 in which the gripping mechanism is mounted on a common support.

3. An apparatus as claimed in claim 2 in which the support is moveable towards and away from the dispenser by a pneumatic or hydraulic piston and cylinder arrangement.

4. An apparatus as claimed in claim 1 in which the gripping mechanism comprises a pair of spaced-apart grippers.

5. An apparatus as claimed in claim 1 in which the gripping mechanism comprises a gripper and a suction tube.

6. A method of manipulating a flexible article comprising the steps of:
    orienting the article within a dispenser;
    opening the dispenser, the dispenser being arranged so that the dispenser continues to support the article when the dispenser is opened; and
    removing the article from the dispenser by a gripping mechanism comprised of one or more grippers, each of said one or more grippers being moveable between an open and closed position, said gripping mechanism being arranged to grip the article at one or more predetermined positions.

7. A method of manipulating a flexible article comprising the steps of
    orienting the article within a dispenser;
    opening the dispenser, the dispenser being arranged so that the dispenser continues to support the article when the dispenser is opened; and
    removing the article from the dispenser by a gripping mechanism arranged to grip the article at one or more predetermined positions.

8. A method as claimed in claim 7 in which the gripping mechanism comprises a gripper and a suction tube, the method including applying suction to the suction tube after activating the gripper to grip the article and drawing at least a portion of the article into the suction tube.

9. An apparatus for manipulating flexible articles comprising:
    an openable dispenser for retaining one article disposed along the dispenser, the dispenser being arranged so that the dispenser continues to support the article when the dispenser is opened; and
    a movable gripping mechanism comprising a pair of spaced apart grippers, each gripper being movable between an open and closed position, said gripping mechanism being arranged to grip the hose at more than one predetermined position and thereafter lift the article from the dispenser.

10. A method of manipulating a flexiible article comprising:
    orienting the dispenser, the dispenser being arranged so that the dispenser continues to support the article when the dispenser is opened; and
    removing the article from the dispenser by a gripping mechanism comprising a pair of spaced-apart grippers, each gripper being movable between an open and closed position, said gripping mechanism being arranged to grip the article at more than one predetermined positions.

* * * * *